(12) United States Patent
Challener et al.

(10) Patent No.: US 8,205,248 B2
(45) Date of Patent: Jun. 19, 2012

(54) LOCAL VERIFICATION OF TRUSTED DISPLAY BASED ON REMOTE SERVER VERIFICATION

(75) Inventors: David C. Challener, Raleigh, NC (US); Daryl Cromer, Cary, NC (US); Howard Locker, Cary, NC (US); Randall S. Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 811 days.

(21) Appl. No.: 11/865,048

(22) Filed: Sep. 30, 2007

(65) Prior Publication Data

US 2009/0089875 A1    Apr. 2, 2009

(51) Int. Cl.
*G06F 7/04* (2006.01)
*H04L 9/32* (2006.01)

(52) U.S. Cl. ............................. 726/7; 713/168
(58) Field of Classification Search ....... 726/7; 713/168
See application file for complete search history.

(56) References Cited

U.S. PATENT DOCUMENTS

| 7,464,412 | B2 * | 12/2008 | Avraham et al. ............ 726/34 |
| 2002/0194496 | A1 * | 12/2002 | Griffin et al. ............ 713/200 |
| 2006/0212939 | A1 * | 9/2006 | England et al. ............ 726/22 |
| 2006/0236127 | A1 * | 10/2006 | Kurien et al. ............ 713/193 |
| 2007/0204166 | A1 * | 8/2007 | Tome et al. ............ 713/182 |
| 2008/0072222 | A1 * | 3/2008 | Bantz et al. ............ 718/1 |
| 2008/0098107 | A1 * | 4/2008 | Jones et al. ............ 709/224 |
| 2008/0163383 | A1 * | 7/2008 | Kumar et al. ............ 726/29 |
| 2010/0011219 | A1 * | 1/2010 | Burton et al. ............ 713/182 |

* cited by examiner

*Primary Examiner* — Techane Gergiso
(74) *Attorney, Agent, or Firm* — Ference & Associates LLC

(57) ABSTRACT

In a system with a main memory, a network adapter, and a display, a transaction security module in communication with the network adapter. The transaction security module acts to: establish a secure identification item with an entity which positively identifies the entity; accept an application OS of the entity; and initiate a guest OS with the entity; the network adapter acting to connect with the entity subsequent to initiation of a guest OS; and the display acting to display the secure identification item subsequent to connection with the entity.

18 Claims, 2 Drawing Sheets

LOCAL VERIFICATION OF TRUSTED DISPLAY BASED ON REMOTE SERVER VERIFICATION

FIELD OF THE INVENTION

The present invention relates generally to online banking or other arenas in which online transactions of one form or another may be managed or processed, and to arrangements for ensuring that transactions are reliably secure.

BACKGROUND OF THE INVENTION

Online computer security has presented numerous challenges over the years. The banking sector has been far from immune from this and in fact has come to represent one of the more vulnerable arenas in which security breaches can and do take place.

A perennial challenge in online banking resides in being able to verify that an online session is indeed secure. Even though a secure operating system (OS) may be employed, and TPM (trusted platform module) can be used to verify the OS. However, verifying that the content of the session is secure can still be quite elusive.

Compelling needs have thus been recognized in connection with providing even more reliable safeguards to ensure reliably secure online banking transactions, while such needs of course can reasonably be addressed in a wide variety of other online arenas.

SUMMARY OF THE INVENTION

In accordance with at least one presently preferred embodiment of the present invention, a "share secret" for use with the bank may be created, via which a secure process can be started to reliably ensure that there is no breach of online security.

In summary, one aspect of the invention provides a method comprising: establishing a secure identification item with an entity which positively identifies the entity; initiating an online session with the entity; accepting an application OS of the entity; initiating a guest OS with the entity; connecting with the entity; displaying the secure identification item.

Another aspect of the invention provides a system comprising: a main memory; a network adapter; a display; and a transaction security module in communication with the network adapter, the transaction security module acting to: establish a secure identification item with an entity which positively identifies the entity; accept an application OS of the entity; and initiate a guest OS with the entity; the network adapter acting to connect with the entity subsequent to initiation of a guest OS; and the display acting to display the secure identification item subsequent to connection with the entity.

Furthermore, an additional aspect of the invention provides a program storage device readable by machine, tangibly embodying a program of instructions executable by the machine to perform a method comprising the steps of: establishing a secure identification item with an entity which positively identifies the entity; initiating an online session with the entity; accepting an application OS of the entity; initiating a guest OS with the entity; connecting with the entity; displaying the secure identification item.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
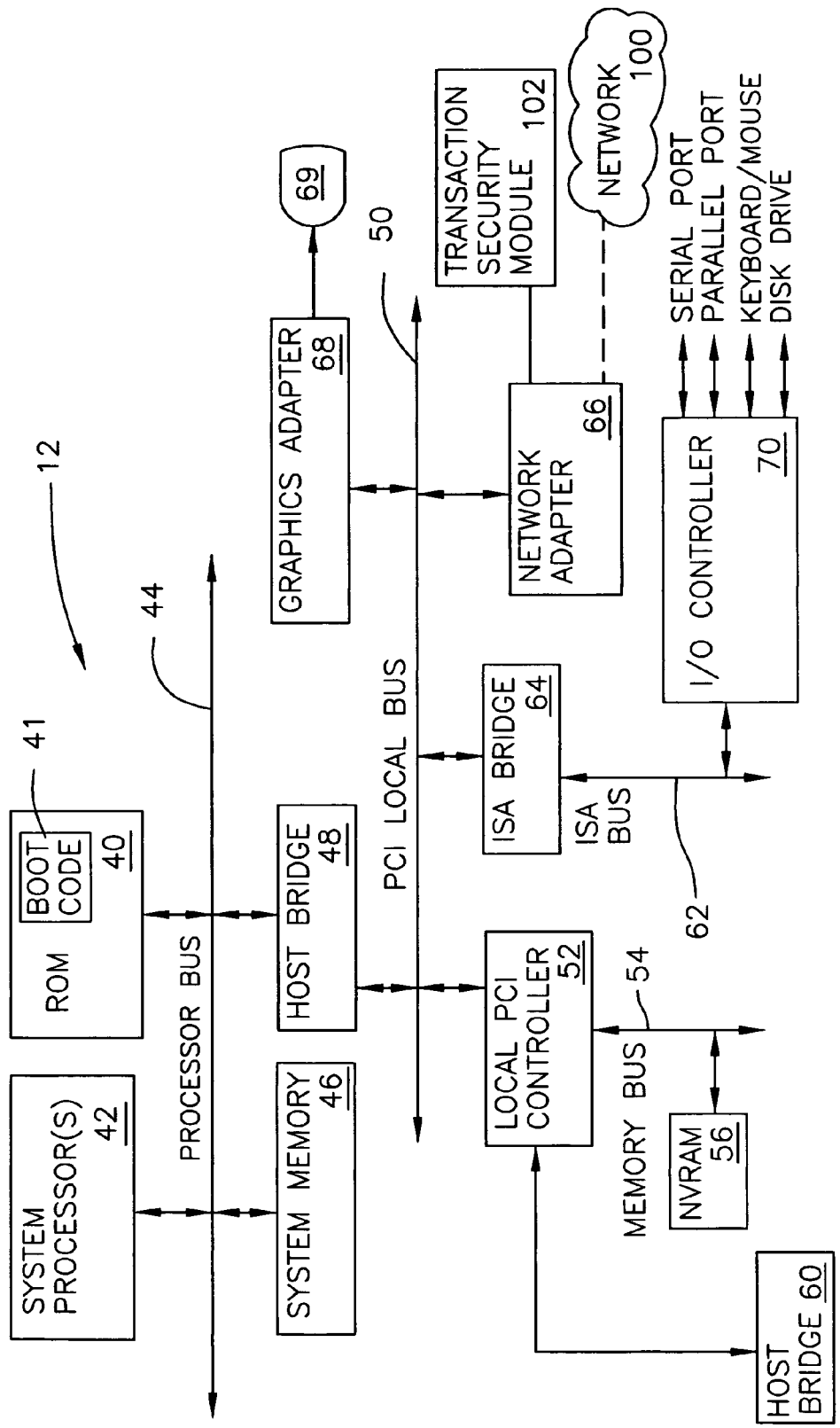
FIG. 1 schematically illustrates a computer system.
Figure 2:
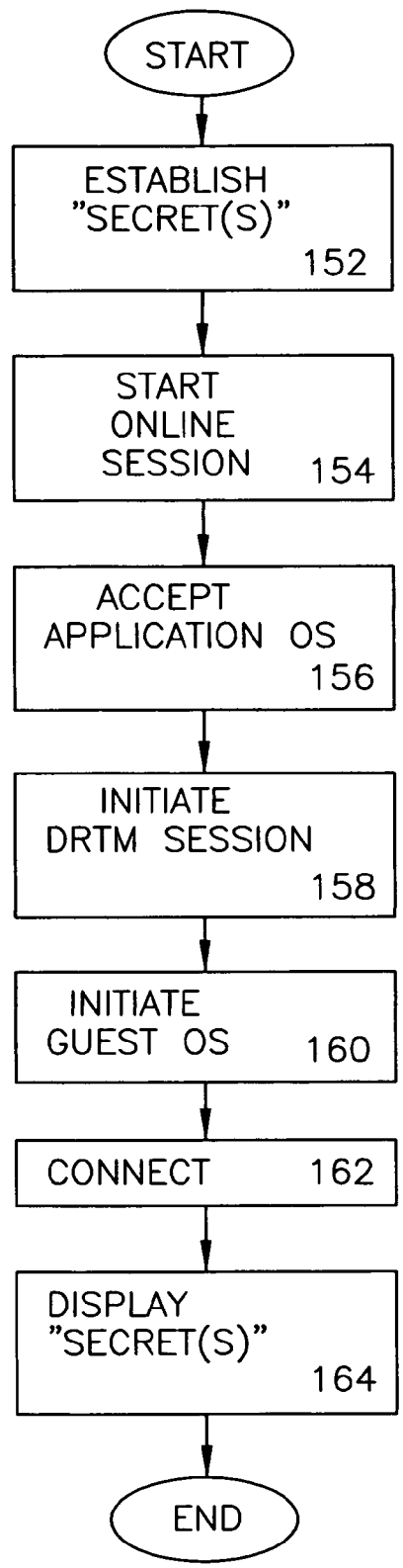
FIG. 2 schematically conveys a verification process.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 2, is not intended to limit the scope of the invention, as claimed, but is merely representative of selected embodiments of the invention.

One or more functional units described in this specification may be labeled as a "module", in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12. The illustrative embodiment depicted in FIG. 1 may be a notebook computer system, such as one of the ThinkPad® or ThinkCentre® series of personal computers sold by Lenovo (US) Inc. of Morrisville, N.C., however, as will become apparent from the following description, the present invention is applicable to any data processing system.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component. Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and disk drive. In addition, I/O controller 70 supports external communication by computer system 12 via serial and parallel ports. Of course, it should be appreciated that the system 12 may be built with different chip sets and a different bus structure, as well as with any other suitable substitute components, while providing comparable or analogous functions to those discussed above.

In accordance with a presently preferred embodiment of the present invention, measures are provided to ensure more secure communication over a network 100, e.g., with a bank or other entity. Preferably, a transaction security module 102 may be incorporated in system 12 to this end. The functioning of such a security module 102 will be better understood from the discussion herebelow.

FIG. 2 schematically illustrates a verification process 150 that may be carried out in accordance with a preferred embodiment of the present invention, via use of the security module 102 mentioned above.

Preferably, at essentially any time prior to conducting an online session with an outside entity such as a bank, a user may present to a bank (or other entity), one or more "shared secrets" (which can alternatively be referred to or thought of as "secure identification items") that could be anything such as an account number, an amount of money in the account, amounts or dates of recent transactions, etc. (152).

Then, when an online session is to be started (154) using a TPM key in known manner, at the user's end the application OS of the outside entity (such as a bank) is preferably accepted (156). To then initiate a DRTM (dynamic root of trust measurement) session using the outside entity's application OS (158), a password known to the bank (or other entity) and TPM can be entered.

Subsequently, a ISO image (disk image with ".iso" extension) supplied by the bank or other entity is preferably loaded onto the user's system, and this will then preferably place the user's machine in a "guest OS" secured by the TPM (160). This guest OS will preferably only contain applications which are known to be secure (as presumably mandated and validated by the bank or other entity). Via an SSL communications protocol session, the user's machine then preferably connects with the bank or other entity (162), provides the bank with a marker such as a user ID, and then asks for "a nonce". (A nonce is simply a random number, used to prevent "replay attacks", wherein a third party listens in to the conversation, records the user's output and then replays that output at a later time, trying to pretend to be the user. Accordingly, it will be appreciated here that since the bank starts out with a random number and subsequent transmissions are calculated using that random number and a secret, a replay attack will inevitably fail.)

Preferably, the bank's application OS then does a quote of the Platform Configuration Registers (PCRs) of the user's machine, using the nonce as a freshness indicator. In other words, the bank's application OS will preferably use the Trusted Computing Groups standard "quote" operation on the user's TPM machine, using a freshness indicator. The user's machine then replies by using a TPM stored key to do a private key digital signature of both the current platform configuration registers and the freshness indicator. The platform configuration registers allow the bank to determine what OS has been loaded into a virtual machine and what hypervisor loaded that virtual machine. (Hypervisors, as well known in the computer arts, allow different operating systems to run on the same hardware concurrently.)

At this point, the TPM key used for setting up the session essentially has proven to the bank that that the user in question is definitely at hand, while the aforementioned quote has proven to the bank that it is in communication with the bank's application OS running on the user's machine. The SSL session has guaranteed that the connection is secure.

Accordingly, in accordance with a particularly preferred embodiment of the present invention, the bank (or other entity) may now send over to the application OS the previously established one or more "shared secrets" for display at the user's end (164), e.g. at display 69 in FIG. 1. Particularly, the application OS now will preferably display the one or more "secrets" on a section of the user's screen that the bank (or other entity) has determined to be in a "trusted state".

(This can be accomplished, e.g., by locking video memory through the chip set.) (More precisely, there is a concern that by displaying secrets on the screen, that they would be available to malware that could do a "screen scrape" of the video memory. New chip sets have the capability of locking this memory so that it is only available to the hypervisor [and hence to the particular virtual machine that the hypervisor grants permission to].) When the user sees the one or more "secrets" appear on the screen, he or she will then understand that he or she is in secure communication with the bank (or other desired entity) and not some other (potentially hostile) entity.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one of ordinary skill in the art without departing from the scope or spirit of the invention. The scope of the invention will be pointed out in the claims, in which reference to an element in singular is not intended to mean "one and only one" unless explicitly so stated, but rather "one or more."

What is claimed is:

1. A method comprising:
   establishing one or more secure identification items with an entity;
   accepting an entity Operating System (OS) at one or more guest computing devices responsive to the one or more guest computing devices initiating an online session with one or more entity computing devices, the entity OS comprising one or more applications;
   initiating the entity OS as a guest OS on the one or more guest computing devices;
   connecting the one or more guest computing devices to the one or more entity computing devices;
   sending one or more guest identification items from the one or more guest computing devices to the one or more entity computing devices;
   sending the one or more secure identification items from the one or more entity computing devices to the one or more guest computing devices responsive to the one or more entity computing devices receiving the one or more guest identification items;
   displaying the one or more secure identification items at the one or more guest computing devices on a display device; and
   initiating a Dynamic Root of Trust Measurement (DRTM) session responsive to accepting an entity OS at one or more guest computing devices.

2. The method according to claim 1, wherein initiating a DRTM session comprises entering a password.

3. The method according to claim 1, wherein initiating the entity OS as a guest OS on the one or more guest computing devices comprises obtaining an ISO image from the one or more entity computing devices.

4. The method according to claim 3, wherein the one or more applications are secure applications.

5. The method according to claim 1, wherein connecting the one or more guest computing devices to the one or more entity computing devices further comprises:
   connecting through a Secure Sockets Layer (SSL) session;
   providing the one or more entity computing devices with a marker; and
   requesting a nonce of the one or more entity computing devices.

6. The method according to claim 5, further comprising performing a quote of at least one Platform Configuration Register (PCR) at the one or more guest computing devices.

7. The method according to claim 1, wherein initiating an online session with the one or more entity computing comprises employing a Trusted Platform Module (TPM) key.

8. The method according to claim 7, wherein employing a TPM key comprises securing the guest operating system utilizing the TPM key.

9. The method according to claim 1, wherein displaying the one or more secure identification items comprises displaying the one or more secure identification items at a region determined to be in a trusted state.

10. The method according to claim 1, wherein the one or more secure identification items are displayed at the one or more guest computing devices in a trusted state established via locking a video memory in operative connection with the display device.

11. A system comprising:
    one or more processors;
    a system memory operatively coupled to the one or more processors;
    wherein, responsive to execution of computer readable program code accessible to the one or more processors, the one or more processors are configured to:
    establish one or more secure identification items with an entity;
    accept an entity Operating System (OS) responsive to initiating an online session with one or more entity computing devices, the entity OS comprising one or more applications;
    initiate the entity OS as a guest OS;
    connect to the one or more entity computing devices;
    send one or more guest identification items to the one or more entity computing devices;
    receive the one or more secure identification items sent from the one or more entity computing devices, the one or more secure identification items being sent responsive to the one or more entity computing devices receiving the one or more guest identification items;
    display the one or more secure identification items on a display device; and
    initiate a Dynamic Root of Trust Measurement (DRTM) session responsive to accepting an entity OS.

12. The system according to claim 11, wherein initiating a DRTM session comprises entering a password.

13. The system according to claim 11, wherein initiating the entity OS as a guest OS comprises obtaining an ISO image from the one or more entity computing devices.

14. The system according to claim 13, wherein the one or more applications are secure applications.

15. The system according to claim 11, wherein connecting to the one or more entity computing devices further comprises:

connecting through a Secure Sockets Layer (SSL) session;

providing the one or more entity computing devices with a marker; and requesting a nonce of the one or more entity computing devices.

16. The system according to claim 11, wherein initiating an online session with the one or more entity computing comprises employing a Trusted Platform Module (TPM) key.

17. The system according to claim 11, wherein displaying the one or more secure identification items comprises displaying the one or more secure identification items at a region determined to be in a trusted state.

18. A program storage device readable by machine, tangibly embodying a program of instructions executable by the machine to perform a method comprising the steps of:

establishing one or more secure identification items with an entity;

accepting an entity Operating System (OS) responsive to initiating an online session with one or more entity computing devices, the entity OS comprising one or more applications;

initiating the entity OS as a guest OS;

connecting to the one or more entity computing devices;

sending one or more guest identification items to the one or more entity computing devices;

receiving the one or more secure identification items sent from the one or more entity computing devices, the one or more secure identification items being sent responsive to the one or more entity computing devices receiving the one or more guest identification items;

displaying the one or more secure identification items on a display device; and initiating a Dynamic Root of Trust Measurement (DRTM) session responsive to accepting an entity OS.

* * * * *